United States Patent Office 3,414,457
Patented Dec. 3, 1968

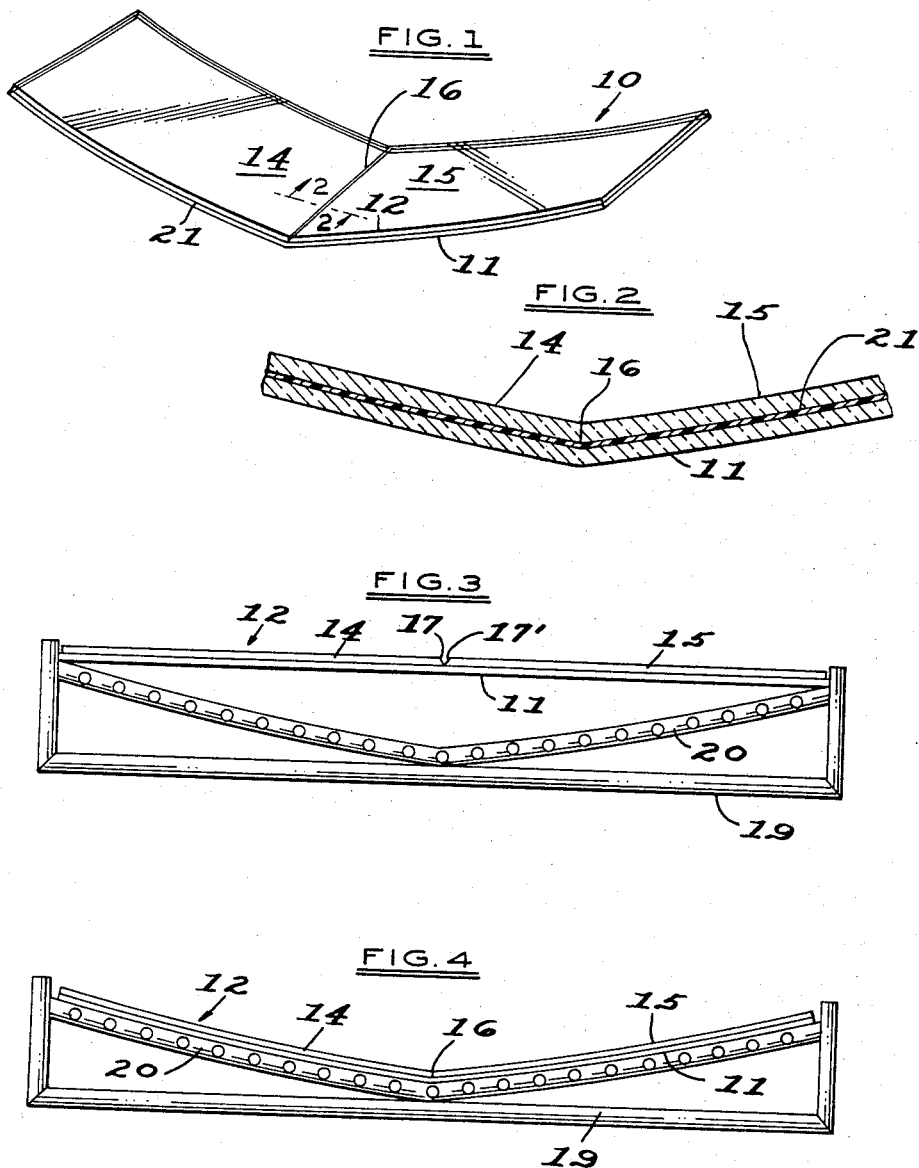
Dec. 3, 1968 — O. I. RUGG — 3,414,457
LAMINATED GLASS ASSEMBLY
Filed Oct. 18, 1965
ORMUND I. RUGG
INVENTOR
BY
P. F. Hilden
ATTORNEY

3,414,457
LAMINATED GLASS ASSEMBLY
Ormund I. Rugg, Detroit, Mich., assignor to Ford Motor Company, Dearborn, Mich., a corporation of Delaware
Filed Oct. 18, 1965, Ser. No. 496,861
4 Claims. (Cl. 161—38)

ABSTRACT OF THE DISCLOSURE

A bent, laminated glass assembly is formed by superimposing two pieces of flat glass, each having a straight edge on the surface of a single sheet of flat glass. The straight edges of the two pieces of glass are placed in an abutting relationship with one another. The unitary undersheet of glass is then bent in a direction away from the superimposed pieces of flat glass thereon to form a sharp bend in the undersheet. During the bending of the undersheet, the straight edges of the two pieces of flat glass are maintained in an abutting relationship and coextensive with the center line of the bend of the undersheet of glass.

---

This invention relates to a laminated glass assembly having at least one sharp bend therein and a method of fabricating the same.

In automotive styling, it sometimes is desirable to shape or form the glass to carry out styling features found in the adjacent sheet metal panels in order to create appearance of unity between the glass and sheet metal. For example, it may be desirable to provide a generally vertically extending sharp bend in a windshield or backlight in continuation of a bead or molding strip on the surface of the hood, roof panel or deck lid. At times, it may also be desirable to form a sharp bend in either a horizontal or vertical direction to effect wraparound of a windshield or backlight into the roof line of the vehicle or into the side surface thereof.

In the bending of laminated safety glass, which conventionally is formed of two laminae of ⅛ inch glass adhered to a polyvinyl butyral interlayer, it is usual to gravity-bend the two glass laminae by superimposing one lamina on top of the other and bending by heat in a ring-type mold which contacts only the margin of the glass. The gravity bending may be assisted by articulating the mold sections so as to close to final contour after the glass has softened. The laminae are then separated and washed before laminating. It has not been feasible to separately bend the ⅛ inch laminae due to minor differences in the bent contour of the glass, which causes the glass to break upon subsequent lamination with the plastic. It has been difficult to obtain a small radius of curvature in bending the superimposed sheets, and smaller radii of curvature produce a large area of distortion in the glass adjacent the bend.

According to the present invention, the inner lamina is formed of two sheets of glass having their edges abutting along the line of the bend. This tends to confine the bend, which occurs substantially entirely in the outer lamina, to a very narrow zone along the line of the abutting edges, the zone of the bend not extending out substantially into the area either side of the abutting edges.

In order to assure conformation of the outer and inner lamina, the two abutting pieces of glass forming the inner lamina are superposed on the outer lamina on a bending mold, the line of weakness of the assembly caused by the severed inner lamina tending to produce a very sharp bend in the outer lamina with a minimum of distortion either side of the bend.

Among the objects of the present invention are to provide an improved laminated glass assembly having at least one sharp bend therein; to provide such an assembly in which the distortion in the zone of the bend is held to a minimum; and to provide an improved method of fabricating laminated glass assemblies having sharp bends therein.

Other objects, and the nature and scope of the invention will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

FIGURE 1 is a perspective view of a laminated glass assembly formed according to the present invention.

FIGURE 2 is a cross section taken along line 2—2 of FIGURE 1.

FIGURE 3 is a side elevation showing the glass laminae in position on the bending mold before bending.

FIGURE 4 is a view similar to FIGURE 3 after bending.

Referring now to the drawings, the laminated glass assembly 10 of FIGURE 1, which is suitable for an automotive windshield or backlight, is shown laminated of an outer and inner lamina 11 and 12 which ordinarily is formed of ⅛ inch nominal thickness plate glass adhered to the opposite faces of a polyvinyl butyral interlayer which customarily is .015 to .030 inch in thickness. The inner lamina 12 is formed of two separate portions 14 and 15 having their edges abutting along a line of bend 16 corresponding with the bend in the outer lamina. After laminating, the joint between the abutting edges of portions 14 and 15 may, if desired, be sealed by clear plastic sealer or may be covered by a narrow molding (not shown) if desired.

The two portions 14 and 15 of the inner lamina 12 together have slightly less area or lateral extent than the outer lamina 11 inasmuch as in the bent product, they will extend about a shorter radius of curvature. Preferably, both the outer lamina 11 and portions 14 and 15 of the inner lamina are template cut to final form before bending and the abutting edges 17 and 17' of the inner lamina are beveled, as indicated in FIGURE 3, so as to form when positioned on the mold for bending a V-shaped notch having its apex at the inner surface of the outer lamina 11. During bending, this notch will substantially close, as explained.

The assembly is bent upon a ring- or skeleton-type mold 19 shown generally in FIGURES 3 and 4. Molds of this type are conventionally used for the bending of glass and have a peripheral rail 20, the top edge of which forms the molding surface for forming the glass. In accordance with present-day practice, the rail 20 may be either single piece, as shown, or formed of articulated sections moved during bending of the glass from an open, glass-receiving position to a closed, final position.

As indicated in FIGURE 3, the outer lamina 11 is first placed on the mold 19 and the inner lamina portions 14 and 15 are then placed upon the outer lamina 11, the edges 17 and 17' of the inner lamina abutting. If desired, a parting agent such as a very light coating of commercial talc may be sprayed on at least one of the confronting faces of the superimposed lamina to prevent sticking of the two lamina during bending.

In accordance with usual practice, the mold 19 with the glass positioned thereon is heated to glass-bending temperature, at which time the glass softens and sags into contact with the upper edge of the rail 20, taking the position indicated in FIGURE 4. Inasmuch as the inner lamina 12 is severed along the line of bend 16, this lack of reinforcement of the outer lamina 11 by the inner lamina 12 will tend to localize the bend in the outer lamina, creating a bend of very small radus. It is recognized, however, that a very minor amount of bend or distortion will extend into the portions 14 and 15 of the inner lamina. The balance of the glass may be substantially flat, as indicated in the drawings, or may be given the customary arced or compound curvature of present-day automotive glass. Also, as indicated in the drawings, the locating point for the radius of curvature for the bend is on the side of the outer lamina 11 away from the rail 20 of the mold 19. Also, as is readily apparent from inspection of FIGURES 1 and 2, the outer lamina 11 is uncut and uninterrupted in the vicinity of the bend 16.

After bending the outer lamina 11 and inner lamina portions 14 and 15 are removed from the mold and washed before laminating. In laminating, a sheet 21 of polyvinyl butyral is placed on the inner surface of the outer lamina 11, and the inner lamina portions 14 and 15 are placed on the sheet 21 in exactly the positions that they occupied after bending. The laminated assembly then can be united by heat and pressure in accordance with present-day practice after which, if desired, any gaps remaining between the abutting edges 17 and 17' may be filled by a clear plastic filler.

The above-described method may be used for providing more than one sharp bend in the laminated glass assembly or providing a generally horizontally extending bend in order to extend the assembly into the roof line of the vehicle.

I claim:
1. A bent laminated glass assembly comprising: a first sheet of glass provided with a bend having a small radius of curvature, the locating point of said radius of curvature being spaced upwardly from a first surface of said first sheet of glass and said first sheet of glass being uncut and uninterrupted in the vicinity of said bend therein, a second sheet of glass, a third sheet of glass, said second sheet of glass and said third sheet of glass having at least portions thereof positioned on said first surface of said first sheet of glass and with one edge of each of said second sheet of glass and said third sheet of glass in abutment with each other, said abutting edges being coextensive with the center line of the said bend in the first sheet of glass, and a continuous adhesive plastic interlayer disposed between said first and second sheets of glass and between said first and third sheets of glass in their mutually adjacent areas to bond said sheets of glass into a unitary, composite laminated glass assembly.

2. A bent laminated glass assembly comprising: an outer sheet of glass provided with at least one sharp bend having a small radius of curvature extending from one side to the other side thereof, the locating point of said radius of curvature being spaced upwardly from a first surface of said outer sheet of glass and said outer sheet of glass being uncut and uninterrupted in the vicinity of said bend therein, an inner sheet of glass in juxtaposition to said first surface of said outer sheet of glass comprising at least two pieces of glass, an edge of one piece of glass being in abutment with one edge of the other piece of glass, said abutting edges of said pieces of glass being coextensive with the center line of and lying within the area of said sharp bend, in said outer sheet of glass, and an adhesive plastic interlayer disposed between said inner and outer sheets of glass to bond said sheets of glass into a unitary, composite assembly.

3. The laminated glass assembly of claim 1 and which is further characterized in that the abutting edges of said pieces of glass are mitered to effect a flush relationship of said edges upon being angularly disposed to each other.

4. In a process for manufacturing a unitary, composite glass assembly provided with a bend having a small radius of curvature, the steps of cutting a sheet of glass into at least two pieces along a straight line, mitering the straight edge of each piece at an angle that will assure abutment of the surface of the mitered edge of one piece with the mitered edge of the other piece when said glass assembly is in its finally bent shape, positioning each piece of glass on an upper surface of a whole sheet of glass with the mitered edges substantially in contact with each other, the whole sheet of glass being so supported in a bending mold that when sufficient heat is applied thereto said whole sheet will be free to sag downwardly to conform with said bending mold to define said sharp bend therein, and heating said glass to form the desired bend while maintaining said mitered edges in contact during heating to assure full abutment thereof and in a coextensive relationship to the center line of the bend being formed in said whole sheet of glass, and laminating said glass after being bent by interposing a plastic interlayer between said sheets of glass and bonding said glass thereto under heat and pressure.

References Cited

UNITED STATES PATENTS

| | | | |
|---|---|---|---|
| 2,202,690 | 5/1940 | Fix | 156—102 X |
| 3,093,527 | 6/1963 | Wheeler | 156—101 X |
| 3,202,568 | 8/1965 | Cottet et al. | 161—190 X |

ROBERT F. BURNETT, *Primary Examiner.*

P. THOMAS, *Assistant Examiner.*